United States Patent [19]

Nickel

[11] Patent Number: 5,725,016
[45] Date of Patent: Mar. 10, 1998

[54] PRESSURE COMPENSATING VALVE FOR A FUEL TANK

[75] Inventor: Hans Nickel, Cottenweiler, Germany

[73] Assignee: Andreas Stihl, Waiblingen, Germany

[21] Appl. No.: 610,263

[22] Filed: Mar. 4, 1996

[30] Foreign Application Priority Data

Mar. 3, 1995 [DE] Germany .................. 295 03 574.9

[51] Int. Cl.$^6$ .................................................. F16K 17/19
[52] U.S. Cl. ................................ 137/493.1; 137/493.8; 137/549
[58] Field of Search ................... 137/493.1, 493.8, 137/854, 549, 550

[56] References Cited

U.S. PATENT DOCUMENTS

| | | | |
|---|---|---|---|
| 1,695,248 | 12/1928 | Crompton | 137/549 X |
| 2,112,641 | 3/1938 | Wheaton | 137/493.1 X |
| 3,115,894 | 12/1963 | Marx | 137/493.1 X |
| 3,155,110 | 11/1964 | Hoffman | 137/493.1 |
| 3,159,176 | 12/1964 | Russell et al. | 137/493.1 |
| 3,289,841 | 12/1966 | Quinting | 137/493.1 X |
| 3,785,401 | 1/1974 | Button | 137/493.8 X |
| 3,941,149 | 3/1976 | Mittleman | 137/493.1 |
| 4,889,160 | 12/1989 | Sheets | 137/549 X |
| 4,946,047 | 8/1990 | Kurokawa et al. | 137/549 X |
| 5,526,843 | 6/1996 | Wolf et al. | 137/550 |
| 5,623,958 | 4/1997 | Bumpers | 137/549 X |

*Primary Examiner*—John Rivell
*Attorney, Agent, or Firm*—Walter Ottesen

[57] ABSTRACT

The invention is directed to a pressure compensating valve for a fuel tank of a work apparatus such as a portable handheld work apparatus equipped with an internal combustion engine. The fuel tank has a tank wall and the pressure compensating valve includes a housing cap defining an inner space and is impermeable to air. A pressure compensating stub is provided on the tank wall and terminates within the housing cap. Pressure compensating apertures are formed in the tank wall to open into the stub and a valve is provided for controlling the apertures for venting and ventilating the fuel tank. A passage connects the inner space of the cap with the atmosphere. A finely porous filter element is fixedly held in the stub and the apertures open into the filter element. The housing cap is mounted on the filter element and is held on the filter element.

19 Claims, 2 Drawing Sheets

PRESSURE COMPENSATING VALVE FOR A FUEL TANK

FIELD OF THE INVENTION

The invention relates to a pressure compensating valve for a tank of a work apparatus such as a portable handheld work apparatus equipped with an internal combustion engine. The tank holds fuel for the engine.

BACKGROUND OF THE INVENTION

A vessel holding fuel is, for example, the fuel tank from which the internal combustion engine is supplied with fuel. An underpressure can build up above the fuel level and this can restrict the outflow of the fuel. For this reason, a pressure compensating valve is provided for a fuel tank which opens with the occurrence of an underpressure and permits outside air to flow into the tank.

If an overpressure builds up because of the action of heat on the fuel tank, then this overpressure is abated by a venting opening mostly configured as a throttle bore. In this context, it must be ensured that no fuel can flow off in an uncontrolled manner.

It is also necessary to ensure that foreign particles do not enter into the fuel tank during ventilating or venting of the tank. Therefore, the pressure compensating stub is mostly covered by a housing cap which has an air-inlet opening which is disposed in a region which is essentially free of dirt.

The valve arrangements for compensating pressure are very complex because of the many requirements.

SUMMARY OF THE INVENTION

It is an object of the invention to provide a pressure compensating valve comprising few parts which ensures a functionally reliable pressure compensation also in areas of use where dirt is present.

The pressure compensating valve of the invention is for a fuel tank of a work apparatus such as a portable handheld work apparatus equipped with an internal combustion engine. The fuel tank has a tank wall and the pressure compensating valve includes: a housing cap defining an inner space and being impermeable to air; a pressure compensating stub on the tank wall and terminating within the housing cap; pressure compensating aperture means formed in the tank wall to open into the stub; valve means for controlling the aperture means for venting and ventilating the fuel tank; passage means for connecting the inner space with the atmosphere; a finely porous filter element; first interface means for fixedly holding the filter element in the stub whereby the aperture means opens into the filter element; the housing cap being mounted on the filter element; and, second interface means for holding the housing cap on the filter element.

The housing cap is seated on a fine-pore filter element which, in turn, is fixed on the pressure compensating stub. The fine-pore filter element filters the outside air flowing in to abate an underpressure as well as filtering the vapor exiting during an overpressure in the tank. If required, the fuel exiting with the vapor is held back in the fine-pore filter element. The filter element not only ensures a dirt particle free ventilation of the tank but also provides certainty with respect to the fuel flowing out from the tank.

The filter element is preferably configured as a hollow-cylindrical, dome-shaped filter cap which is especially held force-tight in the pressure compensating stub. The dome-shaped configuration ensures a large filter surface with only a small amount of space required for the structure. A simple assembly of the fuel element is provided by the axial insertion into the pressure compensating stub.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
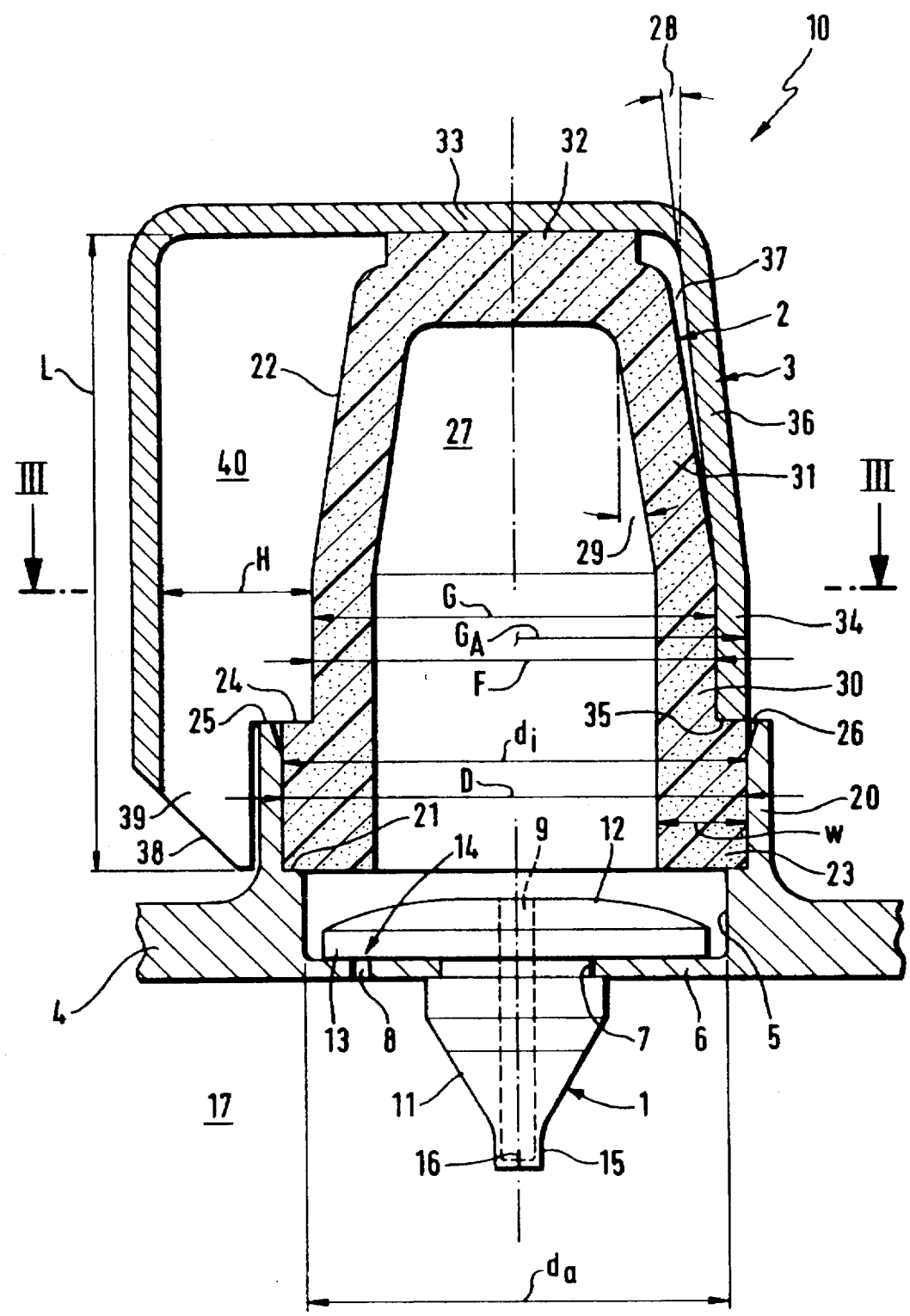
FIG. 1 is a section view taken through a pressure compensating valve according to the invention.

The pressure compensating valve 10 comprises essentially a combination valve 1 which is covered essentially by a filter element 2 which supports a housing cap 3 impermeable to air. The pressure compensating valve 10 is mounted in a wall 4 of a tank which holds, for example, the fuel for a work apparatus. Thus, the vessel can be the fuel tank of a portable handheld work apparatus such as a motor-driven chain saw or the like equipped with an internal combustion engine. A fuel tank of this kind must be capable of being vented as well as also ventilated.

A counter bore 5 open outwardly is provided in the tank wall 4. A central receptacle 7 for the combination valve 1 is provided in the base 6 of the counter bore 5. At least one venting opening 8 is provided in the annular region between the central bore or receptacle 7 and the edge of the counter bore 5. Preferably, a plurality of venting openings are arranged over the periphery. The venting opening 8 is configured as a throttle in the embodiment shown.

The combination valve 1 has essentially a mushroom-shaped configuration and comprises an elastic material such as rubber or the like. The stem 11 of the mushroom-shaped combination valve 1 extends through the receptacle 7. The head 12 of the combination valve 1 lies against the base 6 of the counter bore 5. The counter bore 5 has a depth which is greater than the height of the head 12.

The head 12 covers the venting opening 8. Accordingly, the head 12 forms a valve body 13 which, together with the venting opening 8, defines a venting valve 14 which opens when there is overpressure in the tank.

The stem 11 is snapped into the receptacle 7 and has a ventilating channel 9 which extends axially therein. The ventilating channel 9 is closed at its end facing toward the interior space 17 of the tank. The stem 11 has a free end which is disposed in the interior space 17 of the tank. This free end is configured as a valve bill 15 which has a slit 16 for opening the closed end of the ventilating channel 9. The valve bill 15 is made of an elastic material. The slit 16 is essentially closed air-tight in the unloaded condition of the valve bill. The valve bill 15 is radially pressed together when there is an overpressure in the interior space 17 of the tank so that the slit 16 remains closed. The overpressure abates via the venting opening 8 configured as a throttle. The venting opening 8 is then cleared by the valve body 13 when the valve body 13 is raised.

If an underpressure is present in the interior space 17 of the tank, then the valve body 13 lies on the venting opening 8 air-tight. Outside air enters via the ventilating channel 9 and the slit 16 opens because of the pressure drop at the valve bill 15 and a ventilating of the tank is ensured. The valve bill 15 having the slit 16 defines a ventilating valve.

The counter bore 5 extends into a pressure compensating stub 20 configured similar to a tube or pipe extension. The inner diameter $d_i$ of the stub 29 is greater than the inner diameter $d_a$ of the counter bore 5.

The inner annular shoulder 21 formed thereby limits the depth of insertion of the filter element 2 which has a filter body 22. The filter body 22 is preferably cylindrical and has a dome-shaped configuration. The filter body 22 has a foot section 23 having a wall thickness (w) greater than the remaining filter wall. The foot section 23 has an outer diameter D greater than the remainder of the filter element 2 and defines an outer annular step 24. The outer diameter D is configured with a slight oversize compared to the inner diameter $d_i$ so that the foot section 23 can be held in a force-tight manner in the pressure compensating stub 20 when the filter element 2 is inserted into this stub. The filter element 2 is pushed axially into the stub 20 up to the stop on the annular shoulder 21. The outer annular step 24 is approximately at an elevation with the end face 25 of the stub 20. The end face 25 faces away from the tank wall 4.

The pressure compensating stub 20 corresponds approximately to a receptacle ring and is widened inside at its free end 26 so as to have a slight conical bevel so that the foot section 23 can be axially positioned in the stub 20 and inserted. The pressure compensating stub 20 is preferably integrally formed on the tank wall 4 as an external tube projection.

The half 30 of the filter body 22 which includes the foot section 23 is configured so as to be approximately cylindrically shaped. The other half 31 facing away from the tank wall 4 is configured so as to be shaped as a hollow truncated cone. The interior space 27 of the filter body 22 defines the filter clean space 27 in which the tank is vented and from which the tank is ventilated. The filter element 22 is preferably comprised of sinter material and especially a plastic sinter material such as polyethylene having a pore size of approximately 100 μm and preferably approximately 80 μm. This material also has liquid-storing characteristics so that, when the fuel enters the filter clean space 27, the liquid is stored in the material of the filter element 2 and is returned to the tank when the latter is ventilated.

An outer planar support surface is formed at the closed end of the truncated cone 32 of the filter body 22. The base 33 of the housing cap 3 lies axially against this support surface. The housing cap 3 has an essentially hollow-cylindrical configuration. An attachment section 34 faces toward the tank wall 4 and has a tubular-cylindrical configuration with an inner diameter G. This diameter G is slightly less than the outer diameter F of the tubular-cylindrical half 30 of the filter element 2.

The housing cap 3 therefore engages over the tubular-cylindrical section of the filter element 2 in a force-tight manner. The end face 35 of the housing cap 3 rests in contact engagement with the annular shoulder 24 of the filter element 2. The outer diameter $G_A$ of the housing cap 3 corresponds approximately to the outer diameter D of the foot section 23 or the inner diameter $d_i$ of the tubular projection 20.

The section 36 of the housing cap 3 faces away from the tank wall 4 and is tapered to have a truncated-conical configuration. The conical angle 28 of the housing cap 3 is less than the conical angle 29 of the filter body 22. In this way, an annular space 37 is formed around the filter body 22 in the region of the conical-truncated shaped half 31 thereof. The annular space 37 communicates via air-inlet opening 38 with the atmosphere.

Figure 2:
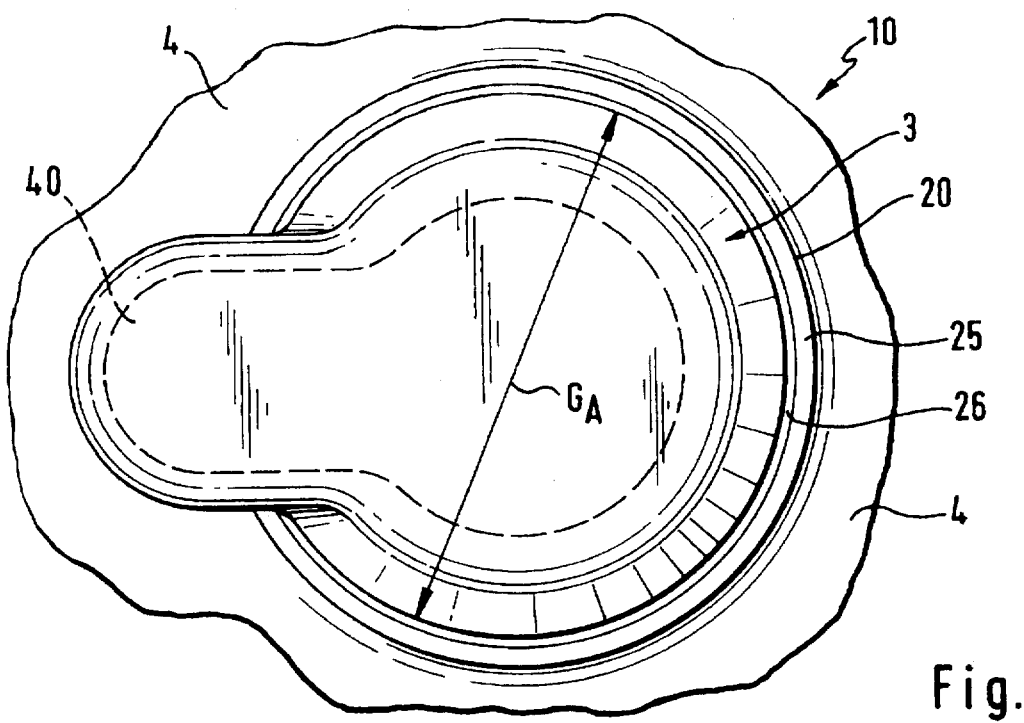
FIG. 2 is a plan view of the pressure compensating valve of FIG. 1.
Figure 3:
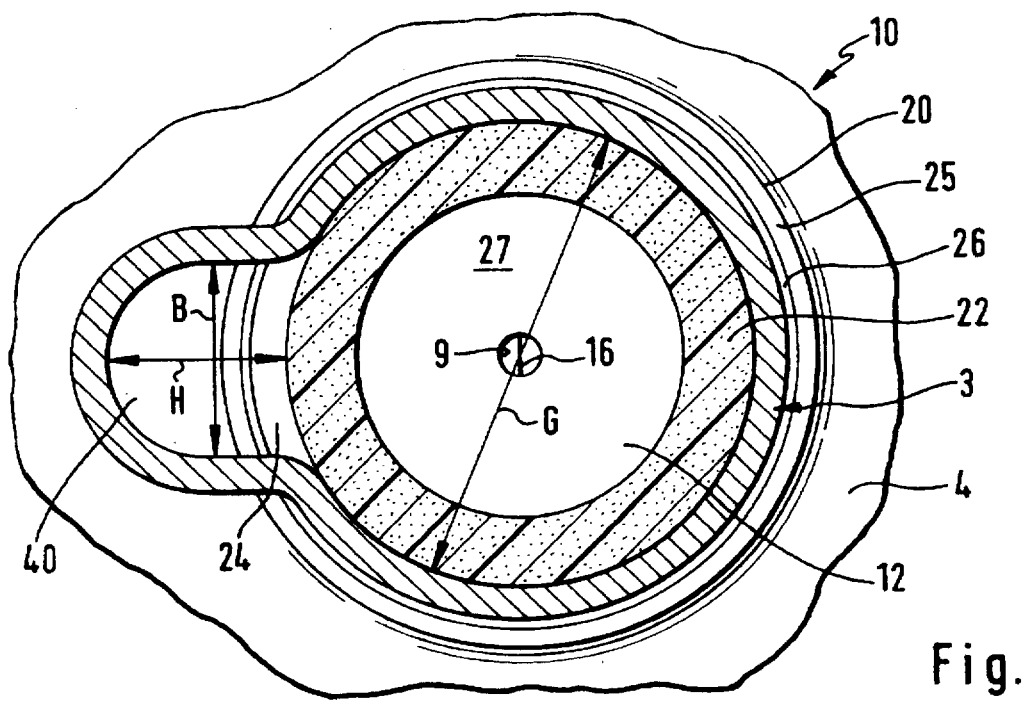
FIG. 3 is a section view taken along the line III—III of FIG. 1.

As shown in FIGS. 2 and 3, the housing cap has an approximately Q-shaped configuration in plan view which is caused by the air channel 40. The air channel 40 extends essentially axially over the entire height of the filter element 2.

The air channel 40 has an average height H which is slightly less than half the diameter F of the filter body 22. The width B of the air channel 40 corresponds approximately to half the inner diameter G of the housing cap 3, that is, approximately the height H. The air channel 40 ends at the base 33 of the housing cap 3 and is open toward the filter body 22 over its entire axial length L. The air channel 40 has an end 39 facing toward the tank wall and overlapping the pressure compensating stub 20 essentially over the entire length of the latter and ends closely in front of the tank wall 4. The end 39 of the channel faces toward the tank wall 4 and is beveled at an angle of approximately 45° in order to ensure an adequate entry of air into the channel 40. In this way, an air-inlet opening 38 directed toward the outside is provided. The air-inlet opening 38 ensures the supply of air into the interior space 37 of the housing cap 3 as well as permitting air to pass from the interior space 37 to the outside.

The end 39 defines the air-inlet opening 38 and projects axially beyond the edge 35 of the housing cap 3. The housing cap 3 has an axial length which is slightly less than the length of the air channel 40. The air channel 40 terminates at a short spacing ahead of the tank wall 4 and overlaps the stub 20.

The pressure compensating valve 10 according to the invention comprises only a few parts, namely, the combination valve 1, the filter element 2 and the housing cap 3. The combination valve 1 is snapped into the tank wall 4 in a simple manner. The filter element 2 is pressed axially into the pressure compensating stub 20. The housing cap 3 is pressed upon the filter element 2 so that the housing cap 3 is held force-tight on the filter element 2 and the latter is held force-tight in the stub 20.

The pressure compensating valve 10 ensures venting of the tank. If fuel emanates from the tank, then it is held back in the material of the filter element 2. The valve bill 15 permits the tank to be ventilated when there is an underpressure present therein. If present, fuel stored in the material of the filter element 2 returns to the tank during ventilation thereof. The invention then permits the fuel tank to be vented as well as ventilated without fuel emanating beyond the filter. The housing cap 3 prevents chips and the like from collecting on the filter element 2 and ensures that the pressure compensating valve operates reliably even under unfavorable operating conditions.

It is understood that the foregoing description is that of the preferred embodiments of the invention and that various changes and modifications may be made thereto without departing from the spirit and scope of the invention as defined in the appended claims.

What is claimed is:

1. A pressure compensating valve for a fuel tank of a work apparatus such as a portable handheld work apparatus equipped with an internal combustion engine, the fuel tank having a tank wall and the pressure compensating valve comprising:

a housing cap defining an inner space and being impermeable to air;

a pressure compensating stub on said tank wall and terminating within said housing cap;

pressure compensating aperture means formed in said tank wall to open into said stub;

valve means for controlling said aperture means for venting and ventilating said fuel tank;

passage means for connecting said inner space with the atmosphere;

a finely porous filter element;

first interface means for fixedly holding said filter element in said stub whereby said aperture means opens into said filter element;

said housing cap being mounted on said filter element; and, second interface means for holding said housing cap on said filter element.

2. The pressure compensating valve of claim 1, said filter element being defined by a filter body having a hollow-cylindrical first section extending into a dome-shaped second section.

3. The pressure compensating valve of claim 2, said first interface means being configured to hold said filter element in said stub in a force-tight manner.

4. The pressure compensating valve of claim 2, said first section including a foot portion engaging said stub; and, said foot portion having a wall thickness (w) greater than the wall thickness of the remainder of said first section and greater than the wall thickness of said second section.

5. The pressure compensating valve of claim 4, said stub terminating in an end face facing away from said tank wall and said end face being at a predetermined elevation above said tank wall; said foot section having an outer diameter (D) greater than the outer diameter of said remainder of said first section and said second section; and, said foot section terminating in an annular step at an elevation corresponding approximately to said predetermined elevation of said end face.

6. The pressure compensating valve of claim 5, said housing cap having an outer diameter ($G_A$) corresponding approximately to said outer diameter (D) of said foot section.

7. The pressure compensating valve of claim 2, said filter element defining a longitudinal axis; said first section being a first half of said filter element measured along said longitudinal axis; said second section being a second half of said filter element measured along said longitudinal axis; and, said second section being configured to correspond to a hollow truncated conical section.

8. The pressure compensating valve of claim 7, said cap having a base wall above said filter element; and, said filter element having an outer end face transverse to said axis and in contact engagement with said base wall.

9. The pressure compensating valve of claim 8, said housing cap having a side wall and said side wall having an end section extending into said base wall; said end section of said side wall having a hollow truncated conical configuration defining a conical angle less than the conical angle of said hollow truncated conical section of said filter element.

10. The pressure compensating valve of claim 5, said housing cap having a lower peripheral edge in contact engagement with said annular step.

11. The pressure compensating valve of claim 7, said second interface means being adapted to hold said housing cap force tight on said first half of said filter element.

12. The pressure compensating valve of claim 1, said housing cap defining an interior space communicating with said filter element and having a Q-shaped section when viewed in plan; and, said housing cap having a passage formed therein to extend axially over the length of said filter element and to communicate with said interior space.

13. The pressure compensating valve of claim 12, said passage communicating with said filter element over all of said length and said passage defining an opening formed in said housing cap so as to face toward said tank wall.

14. The pressure compensating valve of claim 1, said filter element being made of a sinter material.

15. The pressure compensating valve of claim 1, said filter element being made of a plastic sinter material having a pore size of approximately 80 µm.

16. The pressure compensating valve of claim 15, said sinter material being polyethylene.

17. The pressure compensating valve of claim 1, said pressure compensating stub being formed as an external tubular projection integrally with said tank wall.

18. The pressure compensating valve of claim 1, said aperture means including a venting opening formed in said tank wall; and, said valve means including a valve body having a mushroom-like portion mounted in said stub so as to be movable between a first position wherein said venting opening is sealed and a second position wherein said first part is lifted away from said venting opening in response to overpressure in said tank to allow vapor to escape from said fuel tank into said filter element;

said valve means further including a valve bill formed on said mushroom-like portion and defining an outlet which opens in response to an underpressure in said tank; and, said aperture means further including a channel formed in said mushroom-like portion and said valve bill to conduct air to said tank when said outlet opens thereby ventilating the tank and abating said underpressure.

19. The pressure compensating valve of claim 18, said venting opening being configured as a throttle.

* * * * *